United States Patent
Knapp et al.

(10) Patent No.: US 7,801,159 B2
(45) Date of Patent: Sep. 21, 2010

(54) COMMUNICATION SYSTEM AND METHOD FOR SENDING ISOCHRONOUS STREAMING DATA WITHIN A FRAME SEGMENT USING A SIGNALING BYTE

(75) Inventors: David J. Knapp, Austin, TX (US); Patrick Heck, Durmersheim (DE)

(73) Assignee: Standard Microsystems Corporation, Hauppauge, NY (US)

( * ) Notice: Subject to any disclaimer, the term of this patent is extended or adjusted under 35 U.S.C. 154(b) by 361 days.

(21) Appl. No.: 11/961,086

(22) Filed: Dec. 20, 2007

(65) Prior Publication Data

US 2008/0095191 A1     Apr. 24, 2008

Related U.S. Application Data

(62) Division of application No. 10/180,696, filed on Jun. 26, 2002, now Pat. No. 7,327,742.

(51) Int. Cl.
*H04L 12/28* (2006.01)

(52) U.S. Cl. .......................... 370/401; 375/355

(58) Field of Classification Search .................. None
See application file for complete search history.

(56) References Cited

U.S. PATENT DOCUMENTS

| | | | |
|---|---|---|---|
| 5,097,466 A | 3/1992 | Kammerl | |
| 5,621,895 A | 4/1997 | Weis et al. | |
| 5,933,430 A | 8/1999 | Osakabe et al. | |
| 6,052,386 A | 4/2000 | Achilleoudis et al. | |
| 6,373,896 B1 | 4/2002 | Yoo | |
| 6,437,710 B1 | 8/2002 | Tam et al. | |
| 6,466,586 B1 | 10/2002 | Darveau et al. | |
| 6,573,846 B1 | 6/2003 | Trivedi et al. | |
| 6,687,264 B1 | 2/2004 | Yoon et al. | |
| 6,693,895 B1 * | 2/2004 | Crummey et al. ............ 370/352 |
| 6,865,188 B1 | 3/2005 | Stirling et al. | |
| 7,110,473 B2 | 9/2006 | Miller et al. | |
| 7,647,619 B2 * | 1/2010 | Kashima ..................... 725/146 |
| 2001/0040919 A1 | 11/2001 | An | |
| 2001/0055354 A1 | 12/2001 | Fung et al. | |
| 2002/0032788 A1 | 3/2002 | Emanuel et al. | |
| 2002/0075969 A1 | 6/2002 | Sande et al. | |
| 2002/0154647 A1 * | 10/2002 | Potash ....................... 370/412 |
| 2003/0118132 A1 | 6/2003 | Williams et al. | |
| 2003/0225953 A1 | 12/2003 | Ho | |
| 2004/0252036 A1 | 12/2004 | Nitzpon et al. | |

* cited by examiner

FOREIGN PATENT DOCUMENTS

WO     01/84781     11/2001

OTHER PUBLICATIONS

International Search Report, PCT/US03/17826, mailed Mar. 1, 2004.

*Primary Examiner*—Phirin Sam
(74) *Attorney, Agent, or Firm*—Kevin L. Daffer; Daffer McDaniel, LLP

(57) ABSTRACT

A communication system, network interface, and communication port is provided for interconnecting a network of multimedia devices. The multimedia devices can send streaming and/or non-streaming data across the network. The network accommodates all such types of data and assigns data types to time slots or frame segments within each frame to ensure streaming data maintains its temporal relationship at the receiver consistent with the transmitter. A signaling byte is preferably used to keep track of an amount by which isochronous streaming data occupies a frame segment.

14 Claims, 5 Drawing Sheets

COMMUNICATION SYSTEM AND METHOD FOR SENDING ISOCHRONOUS STREAMING DATA WITHIN A FRAME SEGMENT USING A SIGNALING BYTE

CONTINUING DATA

The present application is a division of prior U.S. patent application Ser. No. 10/180,696 filed Jun. 26, 2002.

BACKGROUND OF THE INVENTION

1. Field of the Invention

This invention relates to a communication system, such as a network of interconnected nodes for sending streaming data and non-streaming data, and wherein isochronous streaming data can be sent within a segment of each frame designated by a preceding signaling bit or byte.

2. Description of the Related Art

Communication systems are generally well-known as containing at least two nodes interconnected by a transmission line. A node can function as a data source or destination. If the node is to receive and transmit data, then the node is a combination of a source and destination, and is sometimes known as a transceiver. The data source can transmit data in various forms. For example, the source can transmit in either an analog or digital domain. Typically, however, an analog signal is converted to a digital format before being transmitted across the transmission line to the destination.

It is generally desirable that the transmission line accommodate not only digital or analog data, but also data that can arrive in different forms, hereinafter known as "data types." For example, sophisticated transmission protocols can accommodate streaming data, packetized data, and control data. Streaming data is generally recognized as data that has a temporal relationship between samples produced from a node. The relationship between those samples must be maintained across the transmission line to prevent perceptible errors, such as gaps or altered frequencies. A loss in the temporal relationship can cause a receiver to present jitter, echo or, in the worst instance, periodic blanks in a voice or video stream. Converse to streaming data, packetized data is data which need not maintain the sample rate or temporal relationship of that data and, instead, can be sent as disjointed bursts across a transmission line. The packets of data can be sent across the transmission line at virtually any rate at which that transmission line transfers data and is not dependent in any fashion on any sampling frequency since packetized data is generally recognized as non-sampled data.

In addition to streaming data and packetized data, another type of data can be control data. Depending on how the control data is used (either in a streaming or packetized environment), control data may be either time dependent or non-time dependent on the data or node in which it controls. Moreover, streaming data can be considered as either synchronous data or isochronous data. Synchronous forms of streaming data is data sent across the transmission line in sync with the rate by which the streaming data is sampled. However, it may be that the transmission line transfers data at a different rate than the rate at which the node streams or "samples" data. In order to maintain the temporal relationship between samples of the streaming data, isochronous transfer protocols are needed to accommodate those differences in order for the isochronous data to be played at the destination without perceptible gaps, errors, jitter or echo.

An optimal transmission line can transfer different types of data. Coupled to the transmission line, which can be either copper wire, optical fiber, or wireless, are multiple nodes. Each node can accommodate at least one multimedia device. For example, a telephone multimedia device can be used to send and receive voice information and, depending on differences in sampling rate (i.e., "fs") at the telephone and the frame transfer rate (i.e., "FSR") within the transmission line, the voice information can be either sent as isochronous data or synchronous data. Depending on the relationship between the frame sync rate (FSR) and the sampling rate (fs) streaming data can be presented to the transmission line as either synchronous data or isochronous data. In any instance, control information can be sent to the multimedia device to set up the transmission or to control the receipt of the streaming (isochronous or synchronous) data. In addition to transmitting streaming and control data, the transmission line should also be able to transmit packet information between computers. Packetized data includes executable programs and/or files sent as bursts of digital data across the transmission line.

Multimedia devices operating as sources can therefore produce not only different types of data in different forms, but also data that will arrive at the transmission line at different rates. For example, a voice from a telephone handset is a continuous stream of data having a substantially constant average data rate and a temporal relationship between the samples produced. The isochronous or synchronous forms of streaming data can, therefore, represent sounds (in the example of a telephone or CD player) or images (in the example of DVD player). While telephones, CD players and DVD players send isochronous or synchronous streaming data across a network, a computer sends bursts of packets usually in TCP/IP form across the network.

A need exists in implementing a communication system that can accommodate both streaming and non-streaming data transfers. More importantly, an improved communication system is needed that can send data sampled at a dissimilar rate than the transmission rate across the transmission media, and can maintain the temporal and timed relationship of that streaming data at a destination which reads the streaming data in real time. The desired communication system must, therefore, be synchronized to the transmission of various types of data at, or substantially near, the sampling rate of one or more multimedia devices connected to the transmission medium. The improved communication system must not simply accommodate both streaming and non-streaming data, but also seamlessly accommodate isochronous and synchronous streaming data among a plurality of nodes operating as multimedia devices. In this fashion, the desired communication system can efficiently transfer the different data types synchronously across the network between devices that sample at the same rate as the frame rate or at a rate different from the frame rate and, therefore, an improvement exists by not having the sampling rate dependent on the frame rate.

SUMMARY OF THE INVENTION

The problems outlined above are in large part solved by an improved communication system hereof. The communication system involves not only the network that extends between nodes, but also a transmit port and a receive port. The transmit and receive ports are found within one or more of those nodes, and preferably in all the nodes. A controller within a port is intelligent in that it knows, based on a time-division multiplexed set of channels forwarded within the network, which channel to send to which device. If multiple devices are present within a single node, then a network interface (having a transmit/receive port) dispatches the channel to the appropriate device via, e.g., a local bus. The channels are formed by creating a frame structure that repeats at the audio sampling rate of one or more devices connected to the network. Those devices, therefore, send synchronous streaming data across a time-division multiplexed portion of the frame, with devices that sample at higher or lower frequencies sending isochronous streaming data in another time-division multiplexed portion of the frame. The frames are repeated so as to account for the entire streaming and/or non-streaming message or transaction.

The intelligent controller (at the receive port) not only contains a decoder which determines how to apportion the various time-division multiplexed segments, but also preferably contains a comparator (at the transmit port) which compares the frame sync rate to the sample rate. If a difference exists, the comparator will signal that possibly an empty byte or bytes must be added periodically to an isochronous data transfer. Rate comparison is thereby used to note when to put in the empty byte or bytes, and the comparator will inform the encoder of such, whereupon the encoder then inserts the empty bytes into one or more frames being transmitted across the network.

Routing tables broadcast to each node, possibly during a power-up sequence, will allocate the channels to the powered devices as well as any additional byte fields that may be needed to accommodate isochronous data, for example. If the frame sync rate is different from the sampling rate, then the streaming data is said to be isochronous streaming data. In order to accommodate for a streaming rate that exceeds the frame rate, an additional byte may be placed within the time-division multiplexed segment attributed to isochronous data. At the receive port, in addition to a decoder, a switch apportions the decoded data and, if the data is isochronous, then the decoder can determine where, within a segment reserved for isochronous data, valid isochronous data exists.

According to one embodiment, a transmit port is provided. The port includes a framer adapted for receiving a substantially continuous stream of real-time data sampled at a first rate and placing a portion of the sampled data within a segment of a frame of data upon a network clocked at a second rate dissimilar from the first rate. The frame of data includes at least one signaling bit indicating an amount by which the portion of the continuous stream of data occupies the frame segment.

The signaling bit can indicate that the portion of the continuous stream occupies the entire frame segment, only a portion of the frame segment, or none of the frame segment. The signaling bit can be a byte of N bits, where the most significant bit can designate the entire frame segment as being unoccupied or occupied. The following least significant bits can designate only a portion of the frame segment being occupied, or none of the frame segment being occupied if, indeed, the most significant bit is appropriately designated.

The transmit port is used to transmit data within one or more segments of data, each segment being formed as a channel for data transfer across one or more frames. A receive port is also provided. The transmit port and receive port can be found within a network interface such as between a local bus of interconnected devices and a network or, in the alternative, the transmit and receive ports can be found within a multi-media device itself.

In addition to a transmit and receive port, a communication system is provided. The communication system includes not only the transmitter and receiver portions of a communication path, but also the path or transmission medium between the transmitter and receiver. The communication system, like the transmit and receive ports, accommodates a signaling bit that denotes an amount of isochronous data contained within a corresponding frame segment: either the entire frame segment is occupied, no bytes within the frame segment are occupied, or possibly only the first few bytes within a frame segment are occupied. In the latter instance, the signaling bit can include a byte of N bits used to denote how many byte locations beginning at the least significant byte location are not occupied within a frame segment depending on how many bits are set within the least significant bit locations of the signaling byte.

According to yet another embodiment, a method is providing for transmitting data. The method includes sampling isochronous streaming data at a sampling rate and thereafter transmitting a portion of the streaming data within a segment of a frame allocating an additional byte if the frame containing the segment is to be transmitted across a network at a frame transfer rate less than a rate in which the data is sampled at the source. The method may further include transmitting the signaling byte within the frame containing the frame segment (either before or after the frame segment) or possibly in a frame prior to the frame segment. There may also be one or more segments within a frame, or among multiple frames, that accommodate a single isochronous data transfer. Thus, a segment can be bifurcated into sub-segments across a single or multiple frames, and the signaling byte is used to note where the isochronous data exists within the corresponding segments or sub-segments.

BRIEF DESCRIPTION OF THE DRAWING

Other objects and advantages of the invention will become apparent upon reading the following detailed description and upon reference to the accompanying drawings in which.

Figure 1:
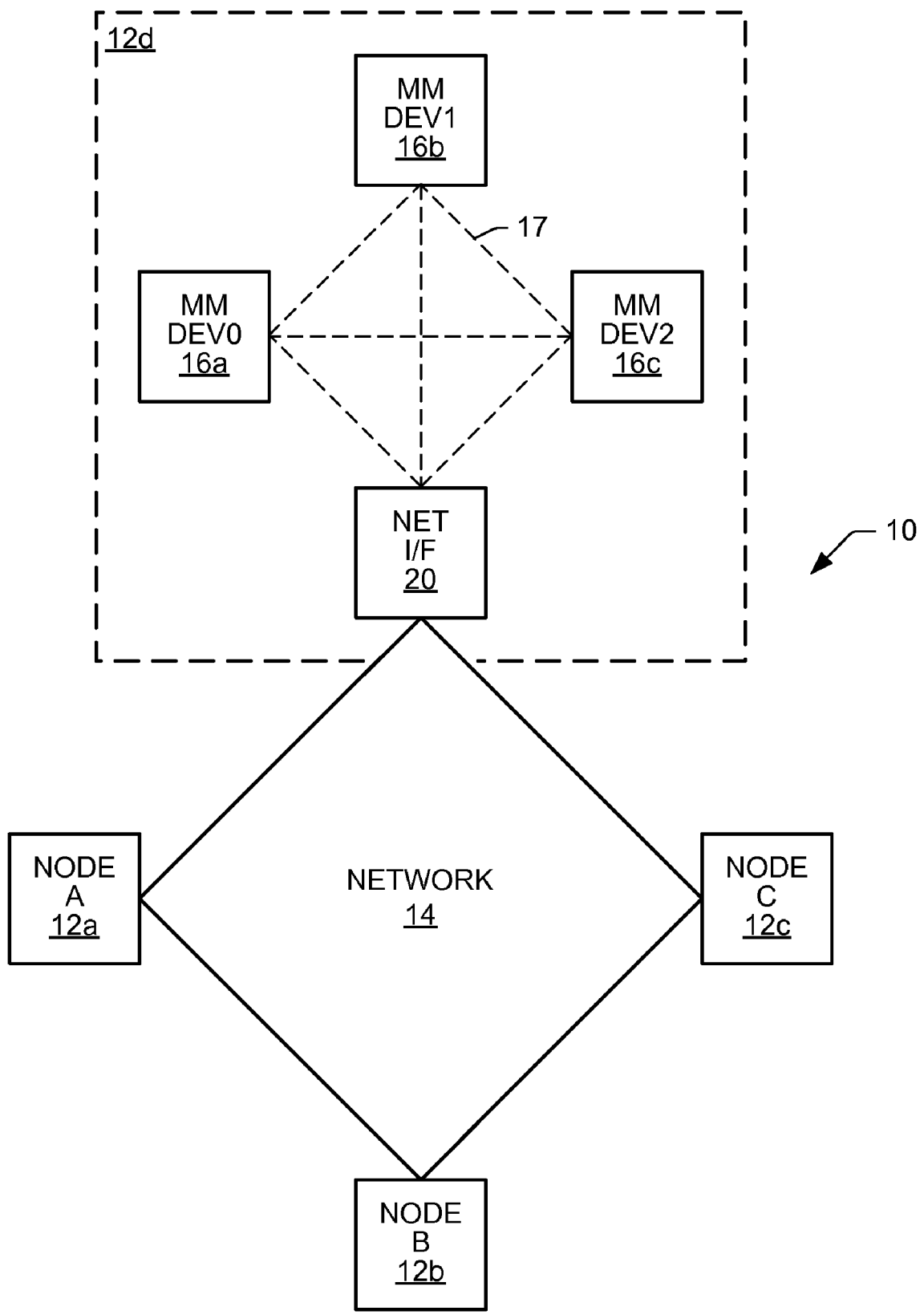
FIG. 1 is a block diagram of a communication system of interconnected nodes across which different types of data can be sent, such as streaming data (synchronous or isochronous), control data and packet data (i.e., asynchronous)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates one example of a communication system 10. Communication system 10 includes an interconnected plurality of nodes 12. For sake of brevity, only four nodes are shown. However, it is understood that system 10 can include more than four nodes and can also include multiple interconnected networks. The network shown in FIG. 1 is a ring or loop. However, it is also understood that the network backbone can be bus, star, or any other topology available to a network. Coupled between nodes 12 are corresponding transmission links 14. Transmission links 14 can be optical, acoustic, or electrical (wired or wireless).

Each node 12 is preferably localized to a particular area. Within each node is at least one multimedia device. As shown in node 12d, a node can have more than one multimedia device 16. If more than one localized device 16 is present, then a local transmission line or local bus can be used between multimedia devices 16 in either a loop or bus topology as shown by the alternative phantom lines 17.

Connected between device 16 and the network of nodes 12 is a network interface 20. If multiple devices 16 are localized to a node 12, the network interface 20 is disposed between a local bus 17 and the network. Interface 20 includes a communication port (i.e., bi-directional transmit and receive port) for transmitting communication between devices 16 arranged in nodes 12. The communication port can also be found within each of the multimedia devices 16 and, depending on its configuration, includes a clock pin, one or two signal pins and at least one data pin or a pair of data pins. As will be appreciated herein, the network interface function can be placed within one or more multimedia device 16 or the network interface can be separate from the multimedia devices. A multimedia device 16 can be found on a single monolithic substrate and the network interface can also be on a single monolithic substrate. Thus, the communication port can be found on, for example, a monolithic substrate of a network interface or on a monolithic substrate of a multimedia device that may or may not contain the network interface.

Preferably, network interface 20 includes a digital signal processor or controller that can be programmed, and can include a memory medium operably linked to the execution unit of the processor. Multimedia device 16, one or more of which are found within a node, is any device that can send and/or receive multimedia signals. Such signals include voice, audio, video, data files, or executable data programs. Examples of such devices include telephones, sensors, CD players, DVD players, video cameras, speakers, monitors, computers, personal digital assistants (PDAs), frequency modulated stereos, navigational systems, etc.

According to one example, the multimedia devices can be located within an automobile, and the communication system 10 can be employed within the automobile for linking the multimedia devices to one another or to multimedia devices within other nodes of the same automobile, or to another automobile, a satellite, or a stationary base station. Depending on whether data is encrypted or encoded at the multimedia device 16, communication system 10 allows transfer of such information to the destination as either streaming data (synchronous or isochronous), control data, or asynchronous (packetized) data. In addition, communication system 10 can allow transfer of all four types of data across one or more channels established within communication line 14 or across local bus 17. Communication system 10 therefore accommodates the different types of data in order to add versatility to the various types of multimedia devices 16 which can be used.

It is recognized that one or more multimedia devices 16 can sample data at a higher sampling rate (fs) than the frame sync rate (FSR) of transmission line 14. For example, multimedia device 16 may be a CD player that samples at approximately 44.1 KHz. The CD player can stream data at, for example, 16 bits per sample audio channel (32 bits/stereo channel), therefore resulting in a bps Baud rate across the transmission line of 32 bits/stereo sample×44.1 K samples/second=1.4112 Mbps. The non-return to zero ("NRZ") data from the device can be encoded in several ways. Data can also be encoded using, for example, the well known Miller encoding technique. Alternative encoding includes bi-phase encoding, or encoding so that the encoded bit stream does not incur an accumulated DC value. The latter encoding mechanism is oftentimes referred to as DC-adaptive encoding, and is described in U.S. Pat. No. 6,437,710.

If the frame sync rate (FSR) across transmission line 14 is different than 48 KHz (e.g., FSR could be chosen to match a CD sample rate of 44.1 KHz), then the streaming data from the 48 KHz sampled DVD player cannot be placed synchronously through transmission line 14 to another node (i.e., a speaker). Instead, the streaming data must be placed as isochronous streaming data as opposed to synchronous streaming data.

In addition to streaming data being asynchronous to the transfer rate of transmission line 14, other types of data can also be asynchronous such as, for example, packetized data or control data. In each instance, however, the various data types are fed across transmission line 14 in synchronous fashion. Communication system 10 is therefore a synchronous transmission system which accommodates dissimilar data types sampled at dissimilar frequencies or data types that are placed in non-regular, non-temporal relationship with one another.

Figure 2:
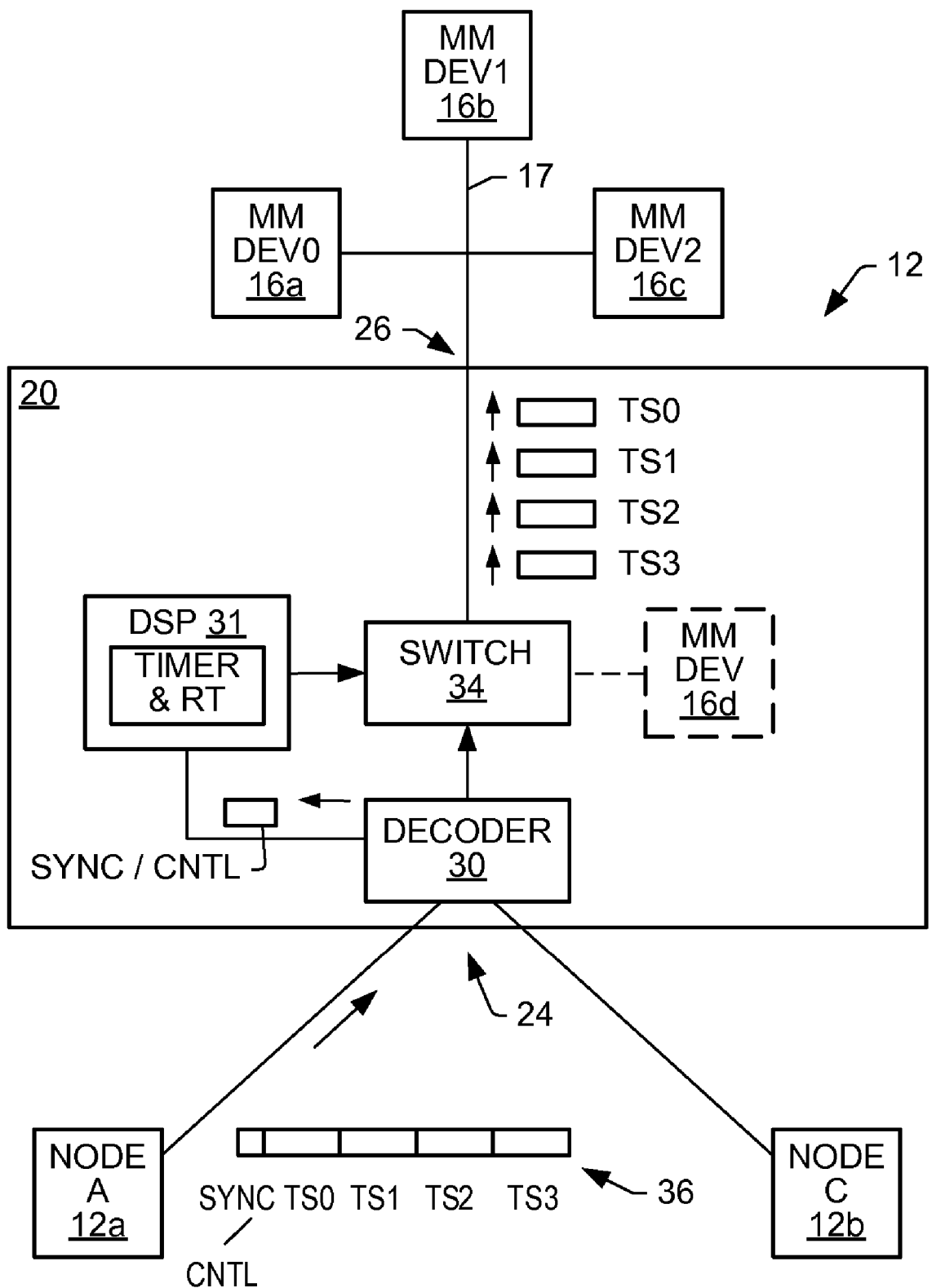
FIG. 2 is a block diagram of a portion of a transmit and receive port within one or more nodes of the communication system.

FIG. 2 illustrates in more detail a network interface 20 shown in a receive mode. The network interface 20 can, therefore, be thought of, in this example, as a receive port from a network and a transmit port to a network. Thus, network interface 20 can include its own device 16, as well as port 24 that connects to the network and port 26 which connects to, for example, a local bus 17. If multiple devices 16 are present within a node, local bus 17 connects locally distributed devices 16 to the controller of the network interface 20 all within, for example, a single node 12. It is important to note, however, that each device 16 can have its own port and that the controller of a network interface can be within that device 16. Alternatively, if multiple devices are found within a node, the network interface can be separate from each device. In each instance, however, either a device 16 or a network interface 20 includes a port which interfaces with (i.e., transmits to or receives from) the network. The port communicates using apportioned time slots for each data type and, if one of the data types carries isochronous data, the port transports a signaling bit/byte within a time slot dedicated to the isochronous data, according to one embodiment, or a coding violation within the data stream of that time slot, according to another embodiment. Details of each embodiment are set forth below.

Depending on the complexity of a node and whether a local bus is used, node 12 typically includes a network interface 20 (or port), which has a decoder 30, digital signal processor ("DSP") 32, and a cross point switch 34. The network which extends between nodes 12 is a synchronous network in that data is time-division multiplexed into a number of channels 36. For example, channels 36 are formed by creating a frame structure of 64 bytes that repeats at an audio sample rate of a device connected to the network via a node. For instance, if the audio sample rate is 48 KHz, the total bit rate of the network between any two nodes 12 is 48 K frames/sec×64 bytes/frame×8 bits/byte=24.576 Mbits/sec.

The synchronization protocol for sending time slots as channels 36 also calls for sending a preamble for each frame bifurcated into time slots. The preamble includes synchronization ("SYNC"). Thus, in the above example, 63 bytes can be used to communicate various types of data at the frame sync rate (FSR). The types of data include streaming isochronous data, possibly placed into time slot 0 (TS0), synchronous streaming data possibly placed within time slot 1 (TS1), and asynchronous packets of data possibly placed in time slot 2 (TS2). Another channel can be formed, possibly in time slot 3 (TS3) to receive control information/data. Possibly two bytes of control may be reserved for the control channel transmitted at TS3, as shown. When, for example, a device 16 is activated or powered-up, routing tables are broadcast across the control channel to each of the other nodes within the network. The control channel contains configuration (or reconfiguration) routing tables needed to accommodate data transfer between the newly activated device or devices. The routing table is therefore established to accommodate all of the various channels or frame portions established to receive the various types of data thereafter synchronously sent across the network between activated devices 16.

The routing table within a memory medium of, for example, the digital signal processor ("DSP") 31 will then identify which bytes within a frame is associated with a particular channel when subsequent communication is desired. Thus, for example, if a DVD is on one channel and a CD on another channel, then the routing table will actually assign time slots to those channels. In this fashion, the DVD player will send audio and video information within a first channel, yet a CD player will send audio information within a second channel allocated according to time slots. The routing tables within each node will also define which nodes get which channels in order to define and apportion all the channels from various sources to appropriate destinations. The channel length is, therefore, fixed and predefined as part of the routing table function for streaming data in order to ensure that isochronous and synchronous streaming data are sent within each frame to maintain its temporal relationship.

Asynchronous data can have, for example, a variable channel length also established within the routing tables when, for example, a computer connected to the network comes on-line. For example, if an isochronous transfer requires an additional byte within successive frames, then the routing table will assign that byte when, for example, a high frequency sampled DVD player comes on-line and is activated to a network previously locked to a lower transfer frequency. Decoder 30 recognizes and decodes the synchronization byte and forwards the control byte to the processor 31, which then updates the routing table within the corresponding node. The synchronization byte is forwarded to a timer within DSP 31, for example. The timer will ensure that the bytes sent across the network are synchronized with the switch 34 in order to appropriately route data to the destination or target at appropriately timed byte boundaries.

The four time slots shown as reference 36 are applicable to a single frame. It is understood, however, that multiple frames are sent in sequence. However, each frame maintains transmission of time slots and channels according to the routing tables. As devices are brought on-line, the routing tables are updated and time slots are allocated. If, for example, on a single pair of devices are on-line, then possibly the entire frame can be allocated to a single frame segment to accommodate data transfers between those devices. However, if the data is streaming, the routing tables are defined to allocate at least one frame segment across all frames sent within the network during times when the streaming source is active. Thus, frame 36 can be repeated and is sent in sequence to decoder 30 from, for example, a source device within a node on the network. Meanwhile, the channels of data are decoded by decoder 30 and sent to switch 34.

Node 12 contains a receive and transmit port having a controller 20 shown in the example configured as a receiver. However, it is understood that node 12 can transmit data as well. Thus, each node is a transceiver which functions as a cross point switch. Each cross point switch 34 within each transceiver routes one or more bytes within a channel of a particular time slot to the appropriate device 16 of a received frame 36. Conversely, switch 34 can route any byte from port 26 to a transmitted frame placed back upon the network. The cross point switch 34 can also route any received byte or channel to any transmitted byte or channel. Switch 34 is thereby configured via the routing tables which were previously set up when devices 16 came on-line via the control bytes sent via the control channel. Once switch 34 is configured to send the bytes within a particular time slot to the appropriate device, streaming data (regardless of whether it is isochronous or synchronous) simply flows from an output port of one device to an input port of another device (or, for example, from input port 24 to the appropriate device 16a-16c via output port 26). For example, device 16a may receive synchronous streaming data, while device 16b may receive isochronous streaming data, and device 16c may receive TCP/IP packetized data. Switch 34 thereby routes the appropriate channels (i.e., data type) automatically to the corresponding device using the predefined routing tables.

Since the network is synchronous, all nodes 12 operate at exactly the same frequency. The clocks associated with the source device are operating at exactly the same frequency as the destination device without inappropriate gaps or jitter. Thus, even though the sampling rate of a source device may be different from the frame sync rate, the ensuing isochronous data can be sent synchronously across the network at the same rate as the network and, possibly, the same rate as other nodes sampling at that rate. The destination address for the various channels within each byte are predefined in the routing tables such that data streaming from a source is sent in real-time to the appropriate destination.

It is recognized that by using time slots and prearranged channel addressing, each node is guaranteed sufficient bandwidth to continuously send streaming data. Therefore, conventional headers and footers normally applicable to sending packetized data across a computer network are not needed. If, contrary to the present protocol, headers and footers are needed for each channel, then as network traffic increases, each node's share of the bandwidth will decrease. At some point, a node will not have enough bandwidth to send the streaming data and there will be gaps or jitter present on the audio, video, or voice stream. Contrary to these detriments, the improved data transfer protocol hereof guarantees bandwidth in each and every frame by pre-assigning data types to channels within a time slot reserved for such data. Even if the frame sync rate is dissimilar from the sampling rate, bandwidth is still guaranteed for sending streaming data. Thus, when a phone call is made or a CD player is turned on, the network provides an exact and guaranteed bandwidth until the end of the call or the end of the CD. If a lengthy phone call is being made or many CD or DVD drives are being used, the connection is not made if there is not enough bandwidth. However, once a connection is made, the streaming data is guaranteed of being sent in each frame of the synchronous network.

Figure 4:
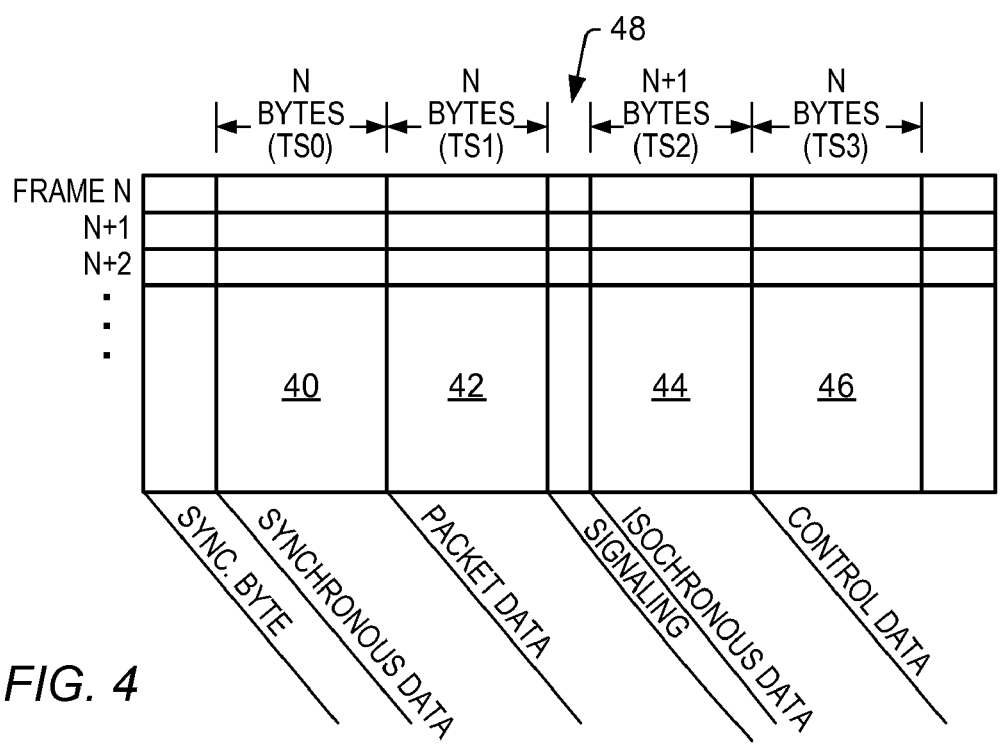
FIG. 4 is a plan diagram of several successive frames of data, wherein each frame has a segment indicative of a time slot reserved for sending streaming isochronous data and at least one signaling bit preceding the streaming data indicative of where the streaming data is within the frame, the length of the frame segment, and the order by which differing channels of streaming data is sent within the frame segment, etc.

FIG. 4 illustrates the different bytes within each frame divided into synchronous streaming data 40, asynchronous packet data 42, isochronous streaming data 44, and asynchronous control data 46. Of course, if it is known that the network will not carry packet data, then, for example, only three segments may apply. Yet, however, the frame segments for streaming data are pre-reserved. In some instances, maybe only one or two frame segments could apply. However, for sake of explanation, all four data types are shown in FIG. 4 apportioned according to time slots (TS). For example, there may be instances in which a telephone message is placed across the network and a CD player is also active. Both the telephone and CD may be sampling data at the same rate in which the network data is being clocked. In that case, two frame segments are reserved within each frame for carrying synchronous data. In this example, there certainly can be more than four time slots, with two or more time slots dedicated to receiving synchronous data and, possibly, another two or more dedicated to receiving isochronous data if, for example, a pair of higher or lower sampling rate players can be activated on the network. If a telephone call is being made but with all other devices inactive (e.g., the other synchronous CD device is inactive), then the time slot dedicated to channels of the telephone call receive data with the frame dedicated solely to the telephone information.

Each time slot can be rather small, such that possibly a time slot can be as small as one byte, thereby allowing possibly 60 time slots in a 60 byte frame. Sixty different channels, where possibly two or more time slots can receive the same data type, yet carry data from different source devices to different destination devices, are therefore available. The time slots and channel routing are all setup and reserved within each frame in application program software and through routing tables established whenever the various devices become active by pressing, for example, a start button on a DVD player, CD player, telephone, etc.

Time slots TS0-TS3 are shown merely as an example and are available as corresponding segments within each frame, beginning with frame N. A N number of bytes can be attributed to each segment. If, however, the network is operating at a lower frame sync rate than a sample rate of a particular device, then possibly another byte will be needed for the segment carrying isochronous data. A typical example might be a network locked to a CD operating at 44.1 KHz attempting to place DVD drive information sampled at 48 KHz. In order to accommodate the higher sampling rate of the DVD drive, an additional byte is placed within the isochronous segment of, for example, time slot TS2. However, if the converse occurs and the network is locked to a DVD operating at 48 KHz and wants to place sampled data from a CD operating at 44.1 KHz upon the network, then, although the sample rate is dissimilar from the frame rate and, therefore, is classified as isochronous data, the CD information can be placed within the isochronous time slot without having to add an additional byte.

It is, therefore, important to note the network locked rate relative to subsequent devices which come on-line to that network. If the subsequent devices are sampled at the same rate as the network locked rate, then the bytes of data can be sent synchronously. Yet, however, subsequent devices which sample at a higher or lower rate must be sent isochronously. Depending on whether the subsequent devices are sending synchronous or isochronous data, the data is allocated to particular time slots by channels which are set up in the routing tables of each node. Those time slots are pre-reserved so that each source and destination device on the network can be accommodated to a time slot based on the type of data being sent and, if more than two devices are sending and receiving the same type of data, two time slots can be pre-reserved for similar types of data.

FIG. 4 illustrates an example where the sampling rate exceeds the frame sync rate and, therefore, an additional byte is placed within the isochronous time slot. However, it is understood that if the sampling rate is less than the frame sync rate, an additional byte is not needed in the isochronous time slot. In every instance, however, the channels set up with time slots are synchronously transferred relative to one another across the network as well as across the local bus (if a local bus is used). Regardless of the data type being sent, each channel of data sent across the network is transferred at the same rate. This allows the network to operate synchronously while accommodating what is normally data that is sent asynchronously, or data that is sampled at a higher or lower rate than the network transfer rate. Each time slot or channel is thereby synchronous with one another. Transferring the channel synchronously is implemented by allocating an additional byte to the synchronous transfer of isochronous data. Thus, while the isochronous data is sent at the same transfer rate as the other channels, a signaling byte is used to identify which of the N bytes (if the sample rate is less than the frame sync rate) or N+1 bytes (if the sample rate if greater than the frame sync rate) in each frame are valid. For example, if the network is operating at 48 KHz and it is desired that a device sample onto the network at 44.1 KHz, then a minimum of 8×44.1/48 bytes/frame, or 7.35 bytes/per frame, are needed to accommodate an 8 byte per frame isochronous channel. In the example where N=8, a minimum of 8 bytes per frame are needed to accommodate this isochronous data, yet only a portion of the 8 bytes in each frame are actually valid. The signaling byte 48 keeps track of which of those frames are valid and which are not.

Figure 3:
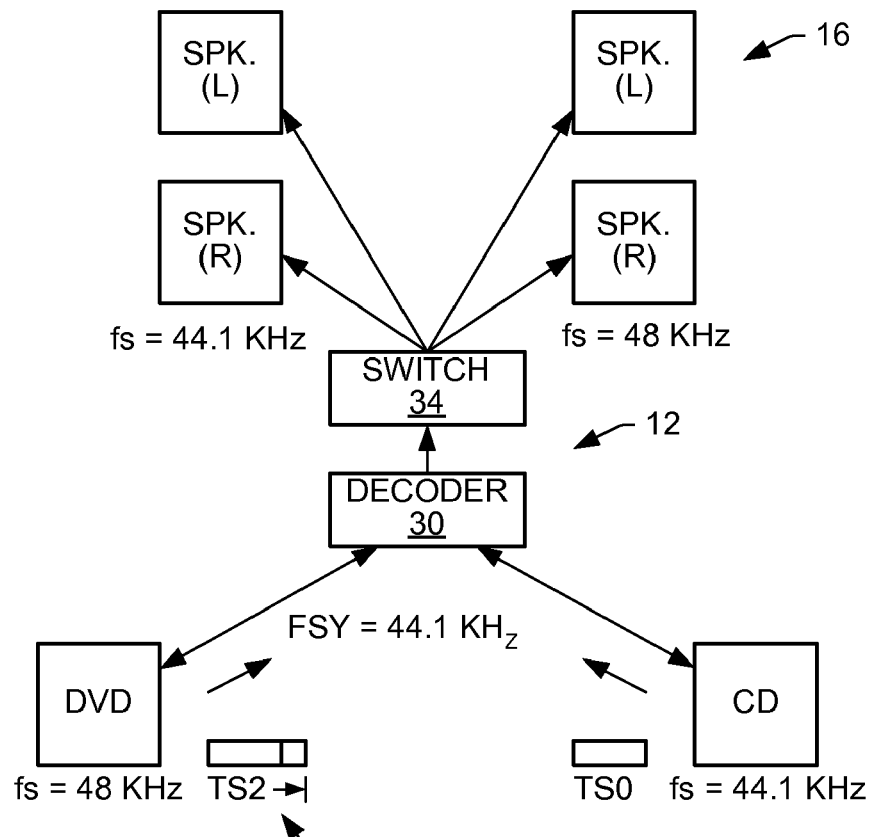
FIG. 3 is a block diagram of a port expanded to accommodate isochronous data sent from a device having a higher or lower sample rate than the frame rate of the network.

FIG. 3 illustrates in more detail node 12 receiving, from another node having a DVD player, streaming data at a sample rate of 48 KHz. Yet, however, the network is locked to and transferring data at a frame sync rate of 44.1 KHz established by data from a CD active on another node which samples at the same rate as the frame sync rate (i.e., 44.1 KHz). Thus, the time slot attributed to receiving isochronous data must be extended by one byte, as shown by the extension of time slot 2 (TS2), noted as reference 52. Yet, however, time slot 0 (TS0) need not be extended to accommodate the synchronous streaming data from the CD. The time slots are compiled as they traverse the network and decoder 30 decodes the coding attributed to the N or N+1 bytes of data sent from the source devices 16. Switch 34 then routes the channels to the appropriate devices 16.

In the example shown, audio information from, for example, the DVD player is converted to analog form and played on the left and right speakers at the same sample rate in which the DVD is played. The same is applicable to the CD which is placed in analog form at the same rate in which the CD is played. The signaling byte keeps track of the isochronous data from the DVD player and the time slots apportion the DVD information separate from the CD information.

Figure 5:
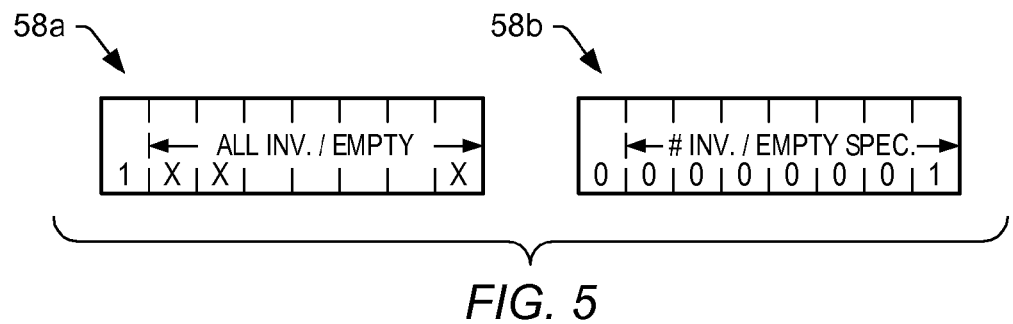
FIG. 5 is plan diagram of bits of data within a signaling byte of data, and the significance of the bits of data.

FIG. 5 illustrates one example of a signaling byte 58. Signaling byte is placed in a byte location preceding an isochronous frame segment of each frame. The most significant bit of byte 58 can either be a 1 or 0. If the most significant bit location is a logic 1, as shown by byte 58a, then all of the other bit locations are irrelevant since the most significant bit of logic 1 is decoded by decoder 30 to signify that all of the isochronous bytes contained within the time slot of the isochronous frame segment are invalid or empty. This means that the frame segment attributed to a frame preceded by signaling byte 58a does not contain any isochronous data.

If, however, the most significant bit location is a logic 0, then the other bit locations have relevance. As shown by signaling byte 58b, the most significant bit location can carry a logic 0 value, whereby the other bits, shown in the example of FIG. 5 as seven bits, signify the number of byte locations of the isochronous frame segment within that corresponding frame that are empty. For example, a logic 1 in the least significant bit location of signaling byte 58b (shown in FIG. 5) connotes that the last or least significant byte location of the isochronous frame segment is empty and contains no isochronous data. Of course, other bit locations can carry a logic 1 value to indicate up to possibly 127 byte locations that are empty, beginning at the far right byte location or least significant byte location within the isochronous frame segment. Therefore, having seven bit locations which define how many bytes are empty can accommodate an isochronous frame segment of up to 127 bytes.

Figure 6:
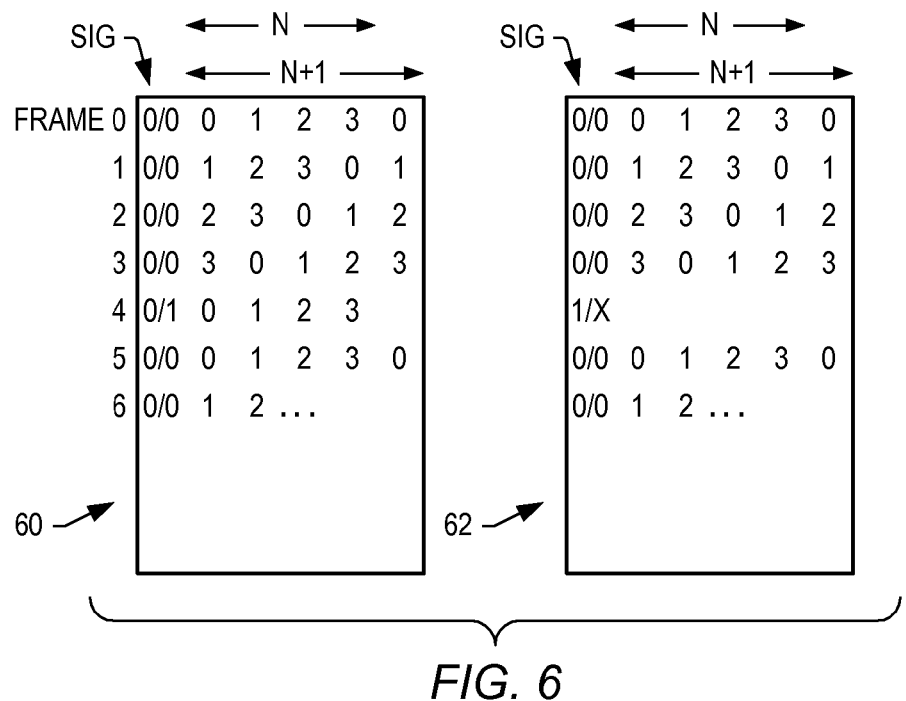
FIG. 6 is a plan diagram of successive frame segments of data and the effect of the preceding signaling byte on the packing of isochronous data within the timeslot dedicated for sending isochronous data.

Referring to FIG. 6, further details of how the signaling byte operates as shown. FIG. 6, in conjunction with FIGS. 4 and 5, show different methodologies for transporting isochronous streaming data within successive frames across the network. Each frame segment attributed to the isochronous data can be either N bytes in length or N+1 bytes in length, depending on whether the sampling rate is less than or greater than the frame sync rate at which the network is currently locked. In the methodology of reference 60, the signaling byte ("SIG") can have a most significant bit of 0 and a remaining set of least significant bits of 0 ("0/0") in frame 0 to indicate the entire frame segment of N or N+1 bytes is not empty. However, at frame 4, while the signaling byte most significant bit can remain at a logic 0 voltage value, the least significant bit can have a logic 1 value to indicate the right-most or least significant byte location is empty and, therefore, does not contain isochronous data. Reference 60 thereby shows a signaling byte similar to signaling byte 58b. It is understood, however, that the least significant bit can be greater than 1 to indicate possibly more than one byte location is empty, beginning at the right-most byte location and preceding to the left-most byte location.

Reference 62 illustrates a signaling byte similar to byte 58a at frame 4. The signaling byte at frame 4 may have a most significant bit indicating a logic 1 value and "don't care" values in the least significant bit locations. A logic 1 value in the most significant bit location will indicate that, for the corresponding frame segment containing isochronous data, all of the byte locations within that frame segment for frame 4 are empty.

The examples shown in FIG. 6 can be for a DVD player sampling at 48 KHz with four bytes per channel sent across a network that is locked to a transfer rate of 44.1 KHz. This will require a 4×48/44.1, or 4.35 bytes per frame to be allocated to the isochronous frame segment. Thus, if N=4, then an additional byte of five total bytes will be needed to accommodate five samples onto four frames (i.e., samples 0, 1, 2, 3, 0 beginning with frame 0, etc.). Since five samples have already been accommodated in four frames, the next frame in sequence (i.e., the fifth frame) can be entirely empty, as shown by reference 62.

The example of FIG. 6 illustrating an isochronous frame segment of only five bytes is purely an example. N is not limited to four and, certainly, can be much larger than four upwards to possibly 127 since; indeed, the signaling byte can accommodate 1-127 empty byte locations. Moreover, if an ensuing source samples at a lower frequency than the locked network transfer rate, then periodically the last byte of N bytes (instead of N+1) does not carry isochronous data, such as that shown in frame 4 of reference 60.

Figure 7:
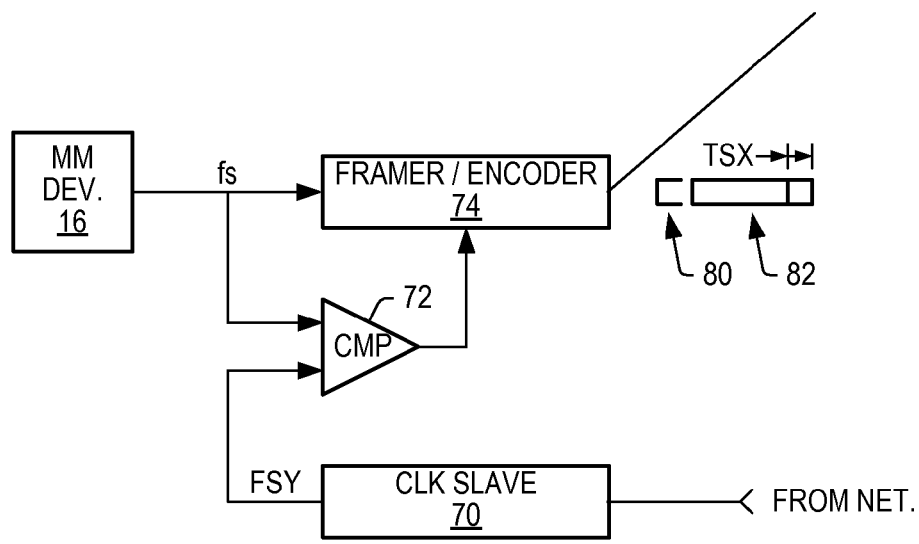
FIG. 7 is a block diagram of a framer which packs data within a frame segment depending on differences between a sample rate of data streaming from a device and a frame rate of data transmitted across a network.

FIG. 7 illustrates possibly one way in which to detect differences between the frame sync rate (FSR) from a network and a sampling rate (fs) from the device 16. A clock recovery circuit or slave unit 70 may be used to detect the frame sync rate by detecting the synchronization bit or byte at the beginning of each frame. The clock recovery circuit might have, for example, a phase-locked loop. Comparator 72 may include, for example, a phase or frequency detector that compares differences between the sample rate and the frame sync rate. If differences exist, then comparator 72 will determine how many empty bytes exist in a frame segment. Secondarily, comparator 72 could possibly be used in a broader sense by possibly noting that isochronous data is present. Preferably, however, comparator 72 is used to determine the number of empty bytes, and not whether or not isochronous data is present. The presence or absence of isochronous data is generally already known and specified when an isochronous device comes on-line, and the transfer of isochronous data is pre-established in the routing tables. The control byte or bytes within the preamble of the initiated device 16 will thereafter establish the routing functionality of the ensuing isochronous data and, depending on whether the sample rate exceeds or is less than the locked network transfer rate, an additional byte may be needed, as shown by reference 82. Framer 74 is a part of the network interface or, if the network interface is placed on a device, forms a part of a multimedia device and, more particularly, forms the communication port of that device. The communication port is placed upon a monolithic substrate which bears the multimedia device and/or network interface.

Figures 8, 9:
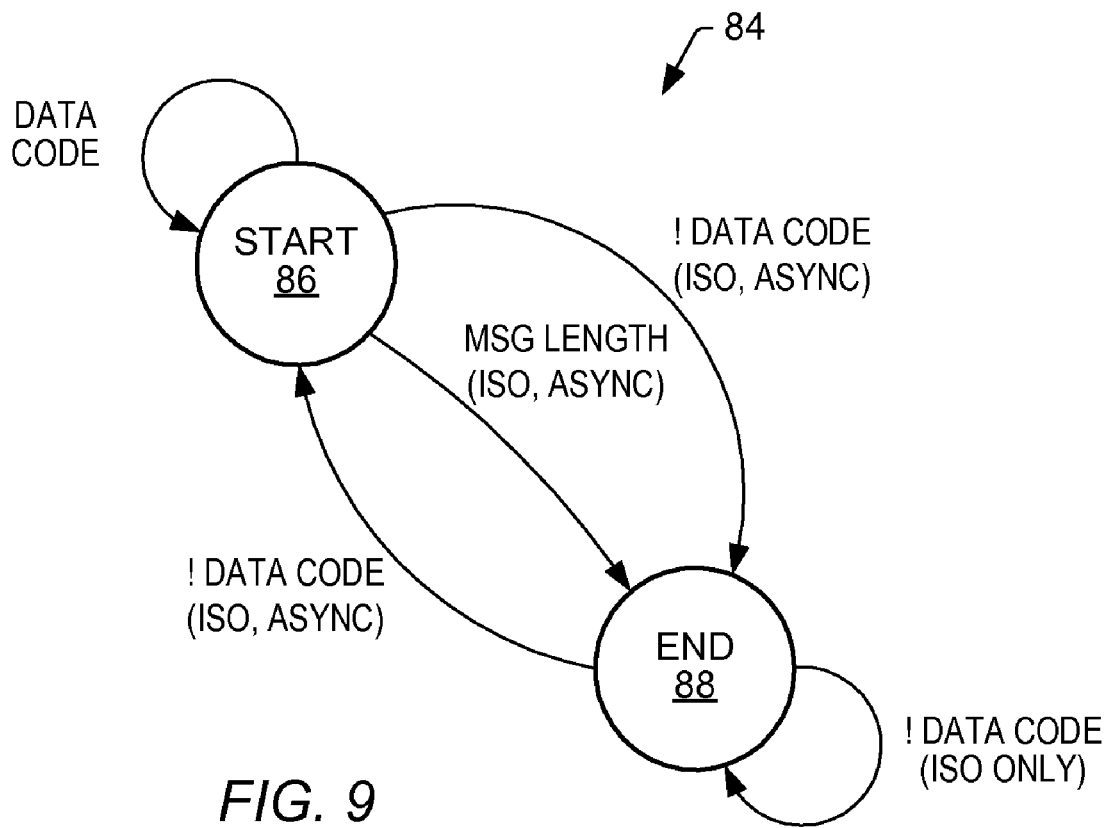
FIG. 8 is a plan diagram, according to an alternative embodiment, of successive frame segments of data and the effect of using a coding violation in the data stream to signal the beginning, the beginning and ending, and/or the non-presence of an asynchronous (packet) data transfer and/or isochronous data transfer within a frame segment.
FIG. 9 is a state diagram of a decoder used to decode coding violations which indicate where, within a frame segment, asynchronous and/or isochronous data exists according to the embodiment of FIG. 8.

FIG. 8 illustrates an alternative embodiment where, essentially, the signaling byte is embedded within the data itself. In other words, the signaling byte is no longer placed before the corresponding segment, but is actually within the segment bearing data. The signaling byte exists as a coding violation and is attributed to either streaming isochronous data or asynchronous data (i.e., packet data). The coding violation within the segment indicates where, within a segment, the isochronous or asynchronous data exists. As opposed to the signaling byte being decoded as a positive, negative, or 0 value preceding the segment, coding violations are decoded as a bit sequence which is not the normal bit sequence of data.

Reference 77 illustrates a coding violation ("V") placed within a frame segment which carries isochronous or asynchronous data. The coding violation, when decoded, signifies the next byte location to be the beginning of a series of bytes which occupy that frame segment as well as one or more successive frame segments until the end of that message has arrived. In the example shown, the message is 8 bytes long, from byte 0 through byte 7. Thus, the message may be a word or phrase of a telephone conversation or a CD or DVD output. Thereafter, another coding violation may exist in, for example, the third frame segment of the successive frames to signify the beginning of the next message which may thereafter have an implicit ending. Reference 77 illustrates examples where isochronous or asynchronous data is sent within a segment and a message is initiated with a coding violation which continues for some defined time thereafter.

Reference 79 illustrates an alternative methodology of using coding violations in the isochronous or asynchronous frame segment. Instead of indicating just the beginning of a message (i.e., the beginning of the data transfer), a coding violation can be placed immediately after the last byte within the data transfer which has occurred. Thus, the encoder places coding violations to signify the beginning and the end of a data transfer. It is not until the next coding violation occurs will the next data transfer occur immediately thereafter.

Reference 81 illustrates yet another example where coding violations are used to fill-in gaps at byte locations between messages or data transfers. In particular, the coding violations which signify invalid or absent data is used only in the transfer of isochronous data. This is due to asynchronous data channels normally being shared by nodes according to an arbitration scheme. The arbiter will grant mastership to one asynchronous device over that of another. If coding violations are being sent with asynchronous data from a master asynchronous device, then mastership will never be turned over to another asynchronous device since data transfer (valid and coding violation data) will never terminate. Isochronous does not arbitrate for mastership. Instead, isochronous data must be sent in real-time and must be sent across frames as it is being sampled. Coding violations to signify empty or invalid bytes of data within a continuous stream of isochronous data occurs within a channel dedicated to isochronous data. Isochronous data does not normally have a message length and, if a message length byte does not exist, then it is preferred that coding violations exist at the beginning and end of the data transfer or that coding violations fill the gaps between data transfers, as shown by reference 81.

The coding violation is code that is not recognizable as data and, when decoded, will indicate that isochronous or asynchronous data will follow (references 77 and 79), or that isochronous data is not present between isochronous data transfers (reference 81). Preferably, coding violation bits are one byte long and, as stated above, is any violation at which data is not known to be coded. For example, a bi-phase code is one where every logic 1 value has a logic 1 and a logic 0 pair of symbols, yet a logic 0 value is coded where both symbols are either a logic 0 or a logic 1 value. Typically, all data is coded and is placed upon the network. To impart a coding violation would be to, for example, include three symbols in a row having a logic 1 value or three symbols in a row having a logic 0 value, to demarcate this violation from typical bi-phase coding, where the maximum amount of logic 1 or logic 0 coded values is a two-symbol width. The decoder can, therefore, easily determine that the non-recognized data is a coding violation to signify the beginning of data in the next byte location, the ending of data in the immediately preceding byte location, and/or absence of data at the byte location containing the violation. For example, the first portion of the violation can designate the coding violation and the last portion of the byte designator of the coding violation can indicate either the start of a particular data type or the end of a particular data type.

FIG. 9 is a state diagram 84 of a decoder such as decoder 30 of FIG. 2. The decoder may detect a coding violation (! DATA CODE) in which case the coding violation occurring when no data is being transferred (state 88), will signify that the next byte location is the start of an isochronous or asynchronous data transfer (state 86). Once at state 86, the decoder recognizes non-coding violations and normal data code and, based on routing tables, forwards the isochronous or asynchronous data to the appropriate destination device. In the case of streaming data (i.e., synchronous or isochronous) data is generally forwarded to all devices based on the routing table.

While in start state 86, eventually the end of a message may occur, either by signifying the message length or having an implicit ending naturally arise when the message is over, in which case the decoder will detect and transition to an end state 88. If, for example, a coding violation is used to indicate the ending of a message or data transfer, then that coding violation (! DATA CODE) will occur, similar to the methodology of reference 79 (FIG. 8). This will initiate the end state 88. Once in end state 88, coding violations may occur at each byte location to signify the absence of isochronous data, as shown by reference 81 (FIG. 8). It is not until the last coding violation occurring between data transfers that the next byte will be a valid data transfer to then again initiate the start state 86.

The various mechanisms by which to signal the beginning of data within a particular channel or time slot includes a signaling byte (in the instances where isochronous data is sent) or coding violations within a byte immediately preceding, immediately after, or in the interim between, data being sent in an isochronous segment.

Numerous variations and modifications will become apparent to those skilled in the art once the above disclosure is fully appreciated. It is intended that the following claims be interpreted to embrace all such variations and modifications.

What is claimed is:

1. A communication port, comprising:
   a framer circuit adapted to apportion each of a successive plurality of frames into multiple segments for accommodating respective dissimilar types of data;
   wherein the framer circuit is further adapted to encode a message and place the encoded message into one segment of the multiple segments of each of the plurality of frames, and to insert a signaling bit into frame N of the plurality of frames to indicate the message begins in the one segment of frame N; and
   wherein the signaling bit comprises a logic value determinative of whether the message begins in the one segment of frame N or if the one segment of frame N does not contain the beginning of the message.

2. The communication port as recited in claim 1, wherein the dissimilar types of data comprise asynchronous data, synchronous data and isochronous data.

3. The communication port as recited in claim 1, wherein the encoded message is placed into the one segment depending on whether the type of data associated with the encoded message is asynchronous data, synchronous data or isochronous data.

4. The communication port as recited in claim 3, wherein encoded message is placed in the one segment of frame N preceded by the signaling bit to indicate the encoded message of isochronous data begins in frame N and ends in the one segment of a frame subsequent to frame N.

5. The communication port as recited in claim 4, wherein the encoded message of isochronous data has a length signified by a coding violation placed in the one segment of a frame subsequent to frame N.

6. The communication port as recited in claim 4, wherein the encoded message of isochronous data has a length signified by a field of bit value placed in the one segment of frame N.

7. A communication system, comprising:
a transmission medium;
a transmitter configured to place a message of a particular type of data into one segment of multiple segments within each of at least two frames beginning with frame N, and wherein the transmitter is further configured to place a signaling bit into frame N; and
a receiver configured to receive the message and the signaling bit sent across the transmission medium from the transmitter to indicate a beginning of the message in the one segment of frame N, wherein the message has a length bounded by a coding violation placed in the one segment of a frame subsequent to frame N.

8. The communication system as recited in claim 7, wherein the signaling bit precedes the one segment of frame N.

9. The communication system as recited in claim 7, wherein the signaling bit is within the one segment of frame N and precedes the message within said one segment of frame N.

10. The communication system as recited in claim 7, wherein the signaling bit precedes the one segment of frame N and all frames succeeding frame N that contain the message.

11. The communication system as recited in claim 7, wherein the particular type of data comprises a substantially continuous stream of real-time data sampled at a first rate and placing the sampled data within the one segment upon the transmission medium clocked at a second rate dissimilar from the first rate.

12. The communication system as recited in claim 7, wherein the particular type of data comprises isochronous data.

13. The communication system as recited in claim 7, wherein an ending of the message occurs in the one segment of a frame subsequent to frame N.

14. The communication system as recited in claim 7, wherein the message has a length signified by a field of bit values placed in the one segment of frame N.

* * * * *